United States Patent [19]

Cornaby

[11] Patent Number: 5,408,501
[45] Date of Patent: Apr. 18, 1995

[54] DATA TRANSFER SYSTEM
[75] Inventor: Stephen R. Cornaby, Niwot, Colo.
[73] Assignee: Conner Peripherals, Inc., San Jose, Calif.
[21] Appl. No.: 43,444
[22] Filed: Apr. 6, 1993
[51] Int. Cl.$^6$ .................. H04K 1/10; H04K 27/28
[52] U.S. Cl. .................. 375/260; 375/36; 375/257; 370/85.7; 370/85.9
[58] Field of Search .............. 375/36, 38, 122; 341/100, 177; 370/85.1, 85.7, 85.9

[56] References Cited

U.S. PATENT DOCUMENTS 5,231,649 7/1993 Duncanson .................. 375/38
5,259,002 11/1993 Carlstedt .................. 375/38

FOREIGN PATENT DOCUMENTS

0458648A2 5/1991 European Pat. Off. .

Primary Examiner—Stephen Chin
Assistant Examiner—Don Vo
Attorney, Agent, or Firm—Fliesler, Dubb, Meyer & Lovejoy

[57] ABSTRACT

A serial data transmission system employing at least three transmission lines for transmitting the serial data. Each of the transmission lines can be designated as a data line 1 or as a data line 2. An encoder dynamically designates, for each binary data bit transmission period, one transmission line as data line 1 and one transmission line as data line 2 such that the transitions representing two data bits being transmitted in two successive transmission periods not occur on any one of the transmission lines. In each binary data bit transmission period, the encoder will cause a transition to occur on either data line 1 or data line 2 as a function of the value of the data bit to be transmitted during that transmission period. A decoder retrieves the data bit for each transmission period in accordance with whether the transition occurred on the transmission line designated as data line 1 or the transmission line designated as data line 2 for that period and determines for the next transmission period which of the transmission lines will be designated as the data line 1 and which of the transmission lines will be designated as the data line 2.

19 Claims, 5 Drawing Sheets

DATA TRANSFER SYSTEM

BACKGROUND OF THE INVENTION

1. Field of the Invention

The present invention relates to a serial data transmission system for serially transmitting binary data over a plurality of transmission lines between a sending station and a receiving station.

1. Description of the Related Art

Serial data transfer systems have the disadvantage of having less bandwidth than parallel data transfer system. The bandwidth of a transmission line is the highest frequency that transitions can reliably be made on that transmission line.

Protocols have been devised for transmitting serial data over two lines for increasing the bandwidth of the transmission system. The IEEE-1394 data exchange protocol is such a two-wire system. The first line is a dedicated data line D on which a transition occurs each time the sequence of binary data changes value, that is the data sequence changes from a 1 to a 0 or from a 0 to a 1. The second line is a dedicated request line R on which two clock transitions occur during each binary data bit transmission period. An example of the IEEE-1394 protocol is shown in FIG. 5. The disadvantage with this protocol is that the highest data frequency that can be transmitted is equal to one half of the bandwidth for the transmission line being used.

The DS link protocol has been developed to overcome the bandwidth disadvantage of the IEEE-1394 protocol. The first line is a dedicated data line D on which a transition occurs each time the sequence of binary data changes value, that is the data sequence changes from a 1 to a 0 or from a 0 to a 1. The second line is a dedicated strobe line S on which a transition occurs each time the sequence of binary data does not change, that is the data sequence remains the same value a 1 to a 1 or a 0 to a 0. For every binary data bit transmission period either a transition will occur on the data line D or on the strobe line S. An example of the DS protocol is shown in FIG. 5. The DS protocol has the disadvantage that the highest data frequency is limited to the bandwidth of the transmission line being used.

SUMMARY OF THE INVENTION

Accordingly, it is an object of the present invention to provide a serial data transmission system over a plurality of transmission lines where the data transmission frequency is not limited by the bandwidth of the transmission lines being used.

It is another object of the present invention to provide an encoder for encoding a plurality of transmission lines for the transmission of binary data, where each transmission line can either be designated as a data line one D1 or as a data line two D2 during any given binary data bit transmission period, such that two sequential binary data bit transmission period transitions do not occur on any transmission line in the system at a frequency higher than the transmission bandwidth of the transmission line.

It is another object of the invention to provide a decoder for determining for each binary data bit transmission period which line is the data line one D1 and which line is the data line two D2 and for recovering the binary data encoded on the transmission lines.

Briefly, the serial data transmission system of the present invention employs at least three transmission lines for transmitting the serial data. Each of the transmission lines can be designated as the data line one D1 or as a data line two D2. Means are provided for dynamically designating, for each binary data bit transmission period, one transmission line as the data line one D1 and one transmission line as the data line two D2 such that two successive data transitions will not occur on any transmission line. In each binary data bit transmission period, an encoding means will cause a transition to occur on data line one D1 if the preceding binary data bit had a different value than the binary data bit being transmitted (a 01 or a 10 combination) or will cause a transition to occur on data line two D2 if the preceding binary data bit had the same value as the binary data bit being transmitted (a 11 or a 00 combination). At the receiving station, means are provided for determining if a transition occurred, during the data bit transmission period, on either the transmission line designated as data line one D1 or the transmission line designated as data line two D2 for that data bit transmission period. Further means are provided for determining, upon the next data bit transmission period, which of the transmission lines will be designated as the data line one D1 and which of the transmission lines will be designated as the data line two D2. Data decoding means is provided to recover the binary data encoded in the sequence of transitions occurring on data line one D1 and data line two D2.

An advantage of the serial data transmission system of this invention is that a transition will occur for each data period on one of the transmission lines in the system where two sequential data bit period transitions cannot occur on any one transmission line at a frequency higher than the transmission bandwidth for the transmission line. Therefore, if three transmission lines were used in the system, the maximum data transmission frequency will be twice the bandwidth of the transmission lines employed. The maximum data frequency for the serial data transmission system is not limited to the bandwidth of the transmission lines being used.

It is another advantage of the serial data transmission system of the invention that the encoder and decoder can be selectively set to encode and decode a selected number of transmission lines such that the encoder and decoder may be tailored to a specific number of available transmission lines.

BRIEF DESCRIPTION OF THE DRAWINGS

The invention will be described with respect to the particular embodiments thereof and reference will be made to the drawings, in which.

DESCRIPTION OF THE PREFERRED EMBODIMENTS

The protocol of the serial data transmission system is as follows:

1. For each binary data bit transmission period a transition may occur on only one transmission line;
2. For each binary data bit transmission period one transmission line will be denoted as the data line one D1 and a second transmission line will be denoted as the data line two D2;
3. For each binary data bit transmission period a transition will occur either on data line one D1 or data line two D2;
4. For each binary data bit transmission period a transition will occur on the data line one D1 if the value of the data bit being encoded is different than the value of the preceding encoded data bit;
5. For each binary data bit transmission period a transition will occur on the data line two D2 if the value of the data bit being encoded is the same as the value of the preceding encoded data bit;
6. After a transition on data line one D1, the transmission line that was least recently used will be designated as the data line one D1 for the next binary data bit transmission period;
7. After a transition on data line two D2, the transmission line that was least recently used will be designated as the data line two D2 for the next binary data bit transmission period.

Figure 1:
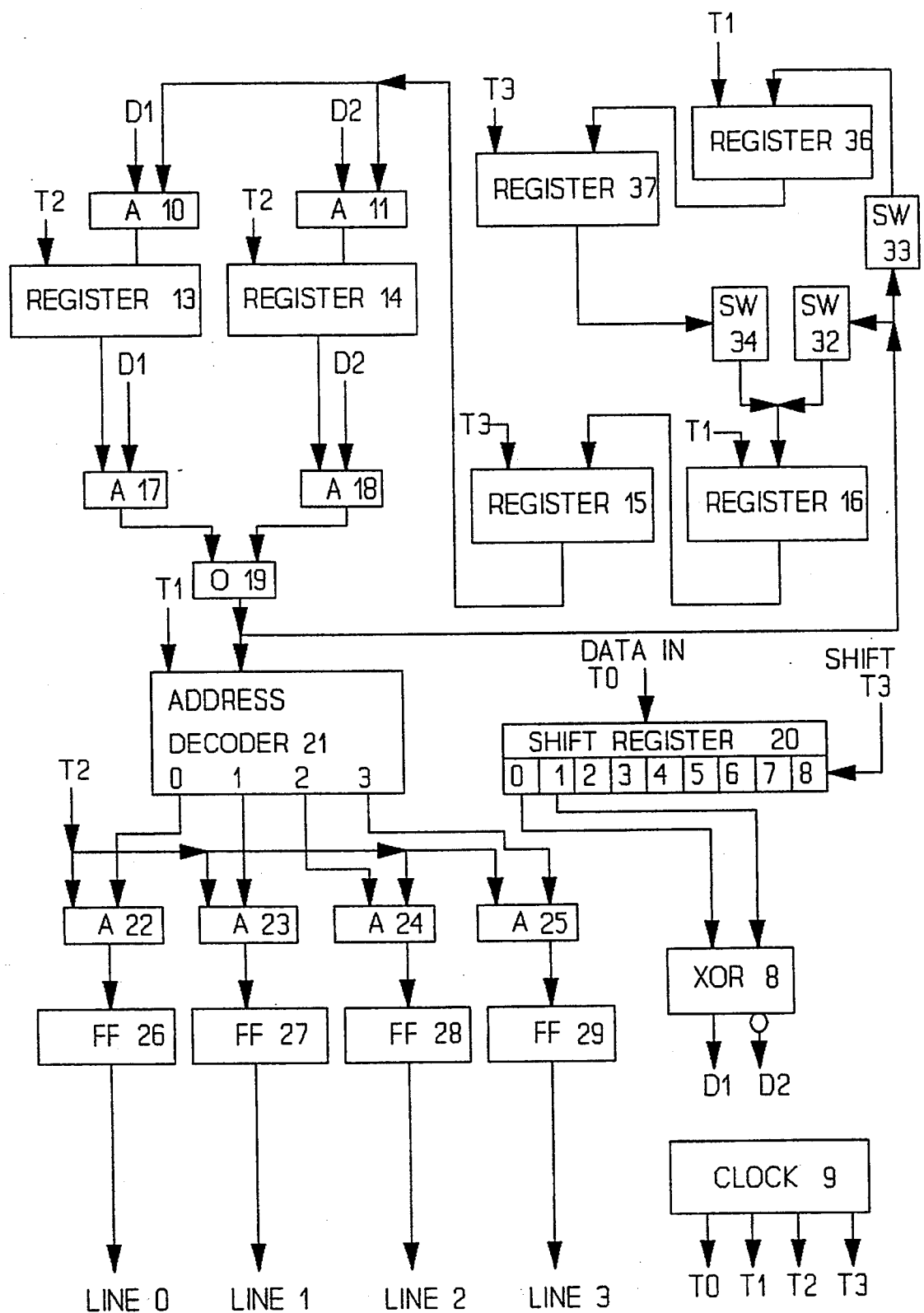
FIG. 1 is the logic diagram of the encoder for the serial data transmission system for encoding and transmitting data over three or four transmission lines.

FIG. 1 is a three or four line encoder for serial data transmission system. A clock 9 generates timing signals T0, T1, T2 and T3 for controlling the operation of the encoder during each binary data bit transmission period. Shift register 20 has nine stages, 0 through 8 and is shifted at T3 of every binary data bit transmission period. A byte of data, eight bits, is stored in parallel in stages 1 through 8 of shift register 20 at T0 of every eighth binary data bit transmission period. Stage 0 of shift register 20 always contains the value of the last encoded binary data bit and for the first cycle will be initialized by the system to a known value prior to the first encoding cycle. Shift register 20 is parallel to serial data converter.

Exclusive OR 8 is connected to stages 0 and 1 of shift register 20. Output D of XOR 8 will be high whenever the contents of shift register 20 stages 0 and 1 are different and output S of XOR 8 will be high whenever the contents of shift register 20, stages 0 and 1 are the same.

At T0, register 13 stores the address of the transmission line designated as data line one D1 and register 14 stores the address of the transmission line designated as data line two D2 for the present binary data bit transmission period.

At T1, either the address stored in register 13, if AND 17 was conditioned by XOR 8, or the address stored in register 14, if AND 18 is conditioned by XOR 8, through OR 19 into address decoder 21 and into register 16 or 17 depending on the status of switch 32 and 33. Address decoder 21 decodes the address it receives from OR 19 and conditions one input of AND 22, 23, 24 or 25. Also at T1, depending on the status of switch 34, the address stored in register 37 will be transferred into register 16. When the encoder is operating in a three line mode, switch 32 will be closed and switches 33 and 34 will be open. When the encoder is operating in a four line mode, switch 32 will be open and switches 33 and 34 will be closed.

At T2, the T2 clock pulse will pass through either AND 22, 23, 24 or 25 and will complement multivibrators 26, 27, 28 and 29, respectively thereby causing a transition to occur on either line 0, 1, 2 or 3 respectively. Also at T2, the address stored in register 15 will either be transferred into register 13 if AND 10 is conditioned by XOR 8 or into register 14 if AND 11 is conditioned by XOR 8.

At T3, the address stored in register 36 is transferred into register 37.

When the system is initialized to begin operation address decoder 21 conditions AND 22, register 13 is set to address 0, register 14 is set to address 1, register 15 is set to address 2 and register 37 is set to address 3. The contents initially of register 16 and 36 need not be preset because they will set to their proper value by the first occurrence of T1.

Registers 15, 16, 37, 36 and switches 32, 33 and 34 form a one stage queue when the encoder is in a three line mode and a two stage queue when the encoder is in a four line mode. The queue can be enlarged to any number of stages to accommodate any number of transmission lines where the number of stages needed in the queue is two less than the number of transmission lines in the system, Address decoder 21 will be expanded to decode the address for each transmission line in the system. An AND and a bistable multivibrator must be added to control the output signal on each additional transmission line. The switches for determining the mode of operation of the serial data transmission system can be manually controlled or can be under remote computer control.

Figure 2:
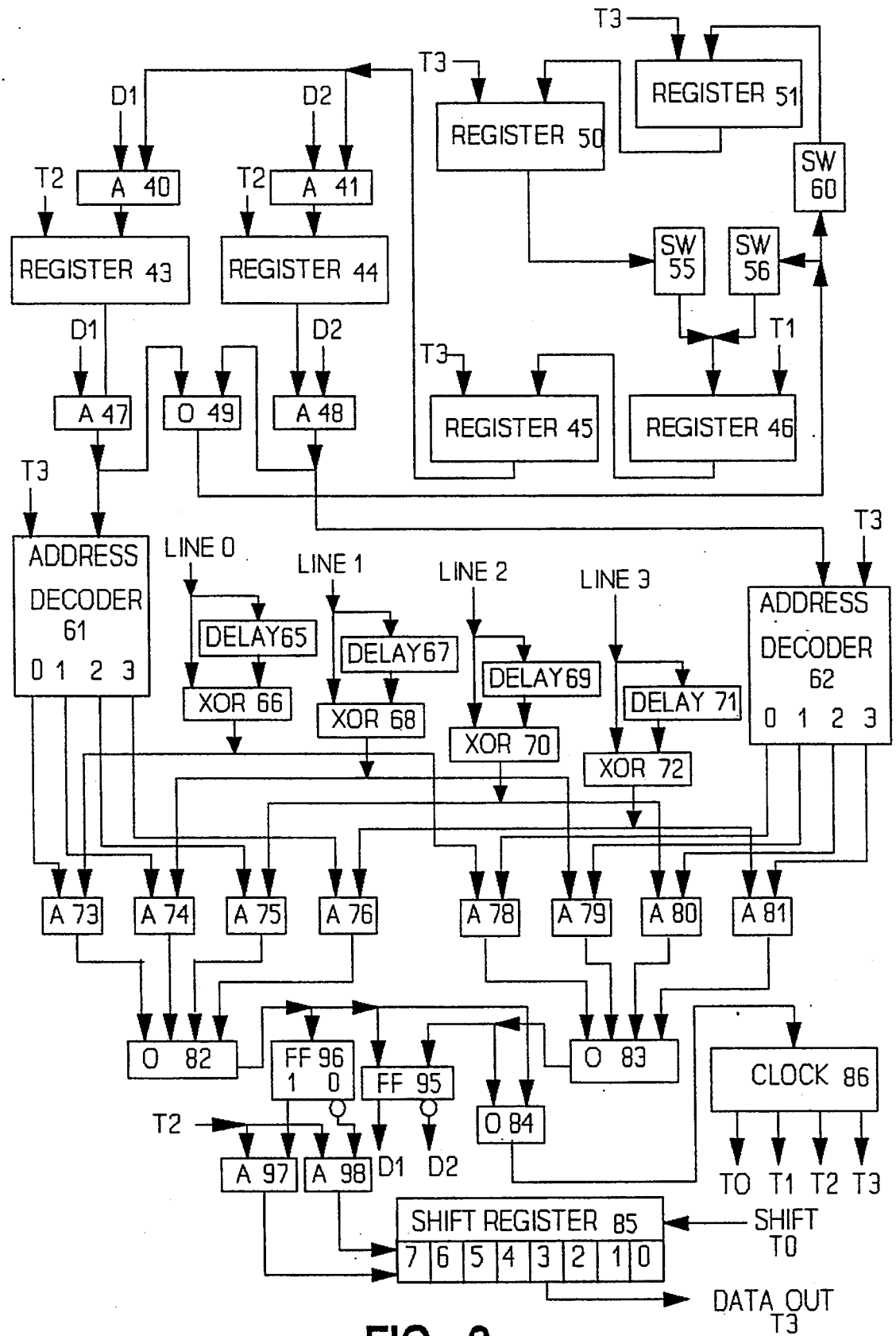
FIG. 2 is a logic diagram of the decoder for the serial data transmission system for receiving and decoding the data encoded on three or four transmission lines.

FIG. 2 is a three or four line decoder for the serial data transmission system. Switch 56 will be closed and switches 55 and 60 will be open when the decoder is in a three line mode. Switch 56 will be open and switches 55 and 60 will be closed when the decoder is in a four line mode. The switches can be set for the proper setting for the desired mode of operation either manually or under remote computer control.

When the decoder is initialized to begin operation, register 43 is set to address 0, register 44 is set to address 1, register 45 is set to address 2, register 50 is set to address 3, address decoder 61 conditions AND 73 and address decoder 62 conditions AND 79. Registers 46 and 51 will be set to their proper address value at the first occurrence of T1.

A transition detector for line 1 is formed from delay 65 and XOR 66 and will produce a pulse for every transition occurring on line 1 where the pulse width is equal to the delay of delay 65. Transition detectors for line 1, 2 and 3 are formed from delay 67 and XOR 68, delay 69 and XOR 70 and delay 71 and XOR 72 respectively.

Address decoder 61 selects which transmission line is the data line one D1 for each binary data bit period by conditioning either AND 73, 74, 75 or 76. Address detector 62 selects which transmission line is the data line two D2 for each binary data bit transmission period by conditioning either AND 78, 79, 80 or 81. A transition pulse passing through either AND 73, 74, 75 or 76 is a data pulse which will pass through OR 82 and will complement bistable multivibrator 96, set bistable multivibrator 95 and will pass through OR 84 to clock 86 to initiate a sequence of timing pulses T0, T1, T2 and T3. A transition pulse which passes through either AND 78, 79, 80 or 81 is a strobe pulse which will pass through OR 83 and will reset bistable multivibrator 95 and will pass through OR 84 to clock 86 to initiate a sequence of timing pulses T0, T1, T2 and T3. When multivibrator 95 is set then the D output is high and when multivibrator 95 is reset then the S output of multivibrator 95 is high.

The data detector is formed from bistable multivibrator 96, ANDs 97 and 98 and shift register 85. Shift register 85 has 8 stages, 0 to 7 and is shifted by each T0 pulse. When the 1 output of multivibrator 96 is high, a timing pulse T2 will pass through AND 97 storing a 1 in stage 7 of shift register 85. When the 0 output of multivibrator 96 is high, a timing pulse T2 will pass through AND 98 storing a 0 in stage 7 of shift register 85. Every eighth T3 pulse will cause the eight bits, one data byte, stored therein to be transfer in parallel out of shift register 85. Shift register 85 acts as a serial to parallel data converter.

At T1, either the address stored in register 43, if the D output of multivibrator 95 is high, or the address stored in register, if the S output of multivibrator 95 is high, will be presented to OR 49. The address output of OR 49 will be stored in register 46 if the decoder is in a three line mode and will be stored in register 51 if the decoder is in a four line mode. The address stored in register 50 will be stored in register 46 if the decoder is in a four line mode.

At T2, the address stored in register 45 will pass through AND 40, if the D output of multivibrator 96 is high, and stored in register 43 or the address stored in register 45 will pass through AND 41, if the S output of multivibrator 95 is high, and stored in register 44.

At T3, the address stored in register 43 will pass through AND 47, if the D output of multivibrator is high, to be decoded by address decoder 61 or the address stored in register 44 will pass through AND 48, if the S output of multivibrator 95 is high, to be decoded by address decoder 62.

The decoder can be expanded to service any number of transmission lines by expanding the address queue as describe for the encoder, providing a transition detector for each new line and expanding address decoder 61 and its associated ANDs and address decoder 62 and its associated AND to service the new transmission lines.

Figure 3:
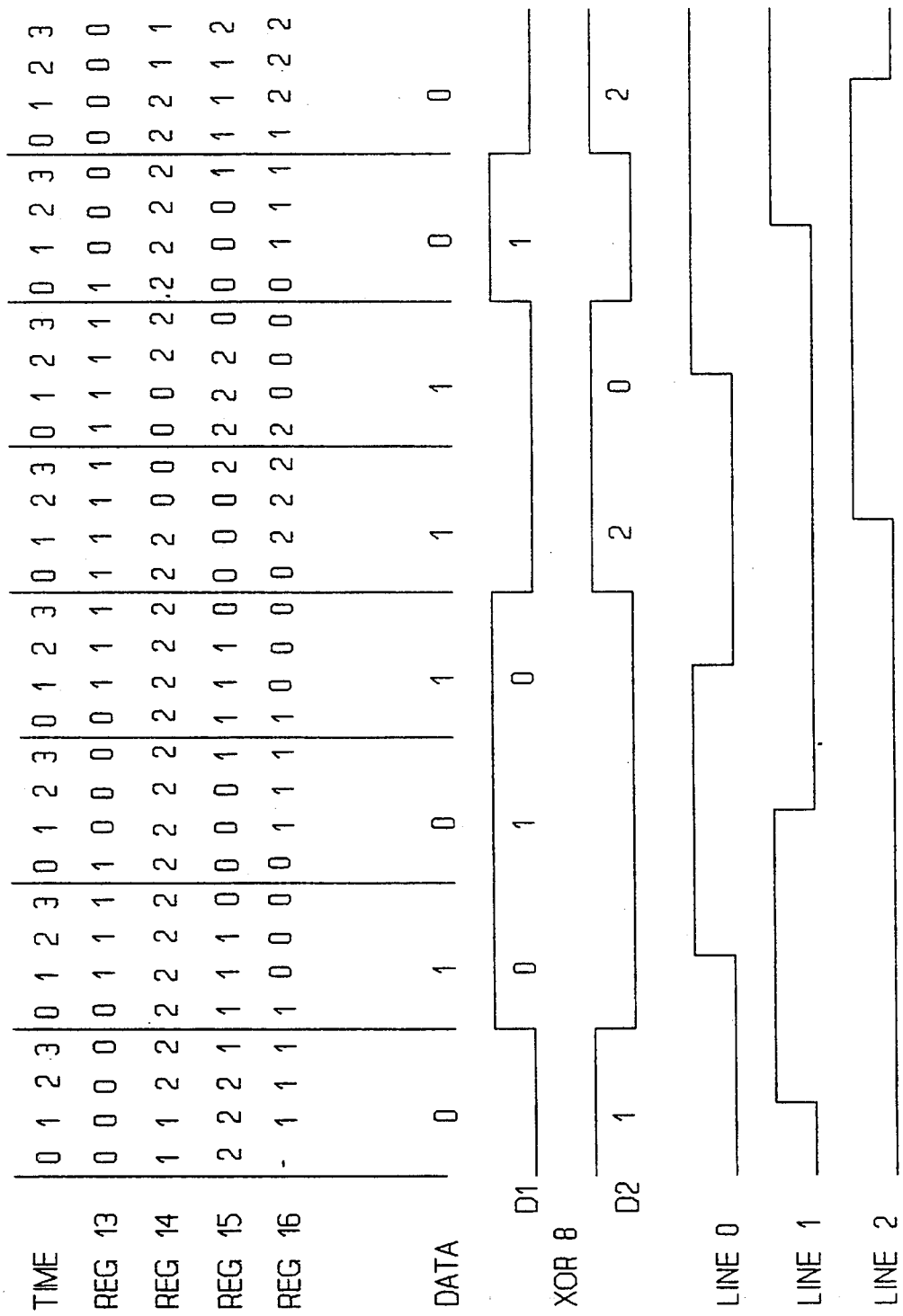
FIG. 3 is a timing chart illustrating the operation of the encoder of FIG. 1 operating as a three line serial data transmission system.

The operation of the encoder of FIG. 3 in the three line mode will be described with reference to the timing chart of FIG. 3. FIG. 3 illustrates eight binary data bit transmission periods for encoding the eight data bits, one byte, stored in shift register 20, the address stored in registers 13, 14, 15 and 16 for T0, T1, T2 and T3 for each period, the state of XOR 8 for each period and the state of line 0, 1 and 2 for each period. The encoder is assumed to be in the initialized state as heretofore described.

At T0 of the first encoding period, the addresses stored in registers 13, 14 and 15 are 0, 1 and 2 respectively, shift register 20 stage 0 contains a 0 and stage 1 contains a 0, exclusive OR 8 output S will be high and output D will be low. At this time the address in register 13 designates line 0 as data line one D1 and the address in register 14 designates line 1 as data line two D2. At T1, the address 1 stored in register 14 will be transferred through AND 18, OR 19 and switch 32 and stored into register 16 and transferred through OR 19 to address decoder 21 which will condition AND 23. At T2, timing pulse T2 will pass through AND 23 complementing bistable multivibrator 27 causing a transition to occur on line 1 and address 2 stored in register 15 will be transferred through AND 11 and stored in register 14. At T3, address 1 stored in register 16 will be transferred and stored in register 15 and shift register 20 will be shifted.

At T0 of the second encoding period, the addresses stored in registers 13, 14 and 15 are 0, 2 and 1 respectively, shift register 20 stage 0 contains a 0 and stage 1 contains a 1, exclusive OR 8 output D will be high and output S will be low. At this time the address in register 13 designates line 0 as data line one D1 and the address in register 14 designates line 2 as data line two D2. At T1, the address 0 stored in register 13 will be transferred through AND 17, OR 19 and switch 32 and stored into register 16 and transferred through OR 19 to address decoder 21 which will condition AND 22. At T2, timing pulse T2 will pass through AND 22 complementing bistable multivibrator 26 causing a transition to occur on line 0 and address 1 stored in register 15 will be transferred through AND 11 and stored in register 13. At T3, address 0 stored in register 16 will be transferred and stored in register 15 and shift register 20 will be shifted.

At T0 of the third encoding period, the addresses stored in registers 13, 14 and 15 are 1, 2 and 0 respectively, shift register 20 stage 0 contains a 1 and stage 1 contains a 0, exclusive OR 8 output D will be high and output S will be low. At this time the address in register 13 designates line 1 as data line one D1 and the address in register 14 designates line 2 as data line two D2. At T1, the address 1 stored in register 13 will be transferred through AND 17, OR 19 and switch 32 and stored into register 16 and transferred through OR 19 to address decoder 21 which will condition AND 23. At T2, timing pulse T2 will pass through AND 23 complementing bistable multivibrator 27 causing a transition to occur on line 1 and address 0 stored in register 15 will be transferred through AND 11 and stored in register 13. At T3, address 1 stored in register 16 will be transferred and stored in register 15 and shift register 20 will be shifted.

At T0 of the fourth encoding period, the addresses stored in registers 13, 14 and 15 are 0, 2 and 1 respectively, shift register 20 stage 0 contains a 0 and stage 1 contains a 1, exclusive OR 8 output D will be high and output S will be low. At this time the address in register 13 designates line 0 as data line one D1 and the address in register 14 designates line 2 as data line two D2. At T1, the address 0 stored in register 13 will be transferred through AND 17, OR 19 and switch 32 and stored into register 16 and transferred through OR 19 to address decoder 21 which will condition AND 22. At T2, timing pulse T2 will pass through AND 22 complementing bistable multivibrator 26 causing a transition to occur on line 0 and address 1 stored in register 15 will be transferred through AND 11 and stored in register 13. At T3, address 0 stored in register 16 will be transferred through and stored in register 15 and shift register 20 will be shifted.

At T0 of the fifth encoding period, the addresses stored in registers 13, 14 and 15 are 1, 2 and 0 respectively, shift register 20 stage 0 contains a 1 and stage 1 contains a 1, exclusive OR 8 output S will be high and output D will be low. At this time the address in register 13 designates line 1 as data line one D1 and the address in register 14 designates line 2 as data line two D2. At T1, the address 2 stored in register 14 will be transferred through AND 18, OR 19 and switch 32 and stored into register 16 and transferred through OR 19 to address decoder 21 which will condition AND 24. At T2, timing pulse T2 will pass through AND 24 complementing bistable multivibrator 28 causing a transition to occur on line 2 and address 0 stored in register 15 will be transferred through AND 11 and stored in register 14. At T3, address 2 stored in register 16 will be transferred and stored in register 15 and shift register 20 will be shifted.

At T0 of the sixth encoding period, the addresses stored in registers 13, 14 and 15 are 1, 0 and 2 respectively, shift register 20 stage 0 contains a 1 and stage 1 contains a 1, exclusive OR 8 output S will be high and output D will be low. At this time the address in register 13 designates line 1 as data line one D1 and the address in register 14 designates line 0 as data line two D2. At T1, the address 0 stored in register 14 will be transferred through AND 18, OR 19 and switch 32 and stored into register 16 and transferred through OR 19 to address decoder 21 which will condition AND 22. At T2, timing pulse T2 will pass through AND 22 complementing bistable multivibrator 26 causing a transition to occur on line 0 and address 2 stored in register 15 will be transferred through AND 11 and stored in register 14. At T3, address 0 stored in register 16 will be transferred and stored in register 15 and shift register 20 will be shifted.

At T0 of the seventh encoding period, the addresses stored in registers 13, 14 and 15 are 1, 2 and 0 respectively, shift register 20 stage 0 contains a 1 and stage 1 contains a 0, exclusive OR 8 output D will be high and output S will be low. At this time the address in register 13 designates line 1 as data line one D1 and the address in register 14 designates line 2 as data line two D2. At T1, the address 1 stored in register 13 will be transferred through AND 17, OR 19 and switch 32 and stored into register 16 and transferred through OR 19 to address decoder 21 which will condition AND 23. At T2, timing pulse T2 will pass through AND 23 complementing bistable multivibrator 27 causing a transition to occur on line 1 and address 0 stored in register 15 will be transferred through AND 11 and stored in register 13. At T3, address 1 stored in register 16 will be transferred and stored in register 15 and shift register 20 will be shifted.

At T0 of the eighth encoding period, the addresses stored in registers 13, 14 and 15 are 0, 2 and 1 respectively, shift register 20 stage 0 contains a 0 and stage 1 contains a 0, exclusive OR 8 output S will be high and output D will be low. At this time the address in register 13 designates line 0 as data line one D1 and the address in register 14 designates line 2 as data line two D2. At T1, the address 2 stored in register 14 will be transferred through AND 18, OR 19 and switch 32 and stored into register 16 and transferred through OR 19 to address decoder 21 which will condition AND 24. At T2, timing pulse T2 will pass through AND 24 complementing bistable multivibrator 28 causing a transition to occur on line 2 and address 1 stored in register 15 will be transferred through AND 11 and stored in register 14. At T3, address 2 stored in register 16 will be transferred and stored in register 15 and shift register 20 will be shifted. In this eighth encoding period a new eight data bits will be parallel transferred into stages 1 through 8 of shift register 2 and stage 0 of shift register 20 will contain the last data bit of the preceding byte. Also registers 13, 14 and 15 store addresses 0, 1 and 2 respectively which will be used during the first encoding period for the newly stored data byte. It should be noted that the addresses stored in registers 13, 14 and 15 at the end of the eighth encoding period will be a function of the data bit sequence for the encoded byte such that the ending addresses stored in registers 13, 14 and 15 will not necessarily have the value 0, 1 and 2 respectively.

From the foregoing it can be understood that the methodology included within the encoder ensures that two consecutive transitions will not occur on the same transmission line at a frequency higher than the transmission line bandwidth for the transmission lines. It is important to note that each of the three lines have been designated as data line two D2 and data line one D1 during a encoding period for the processing of the eight data bits and, therefore, each of the transmission lines is not dedicated only as a data line one D1 or only as a data line two D2.

Figure 4:
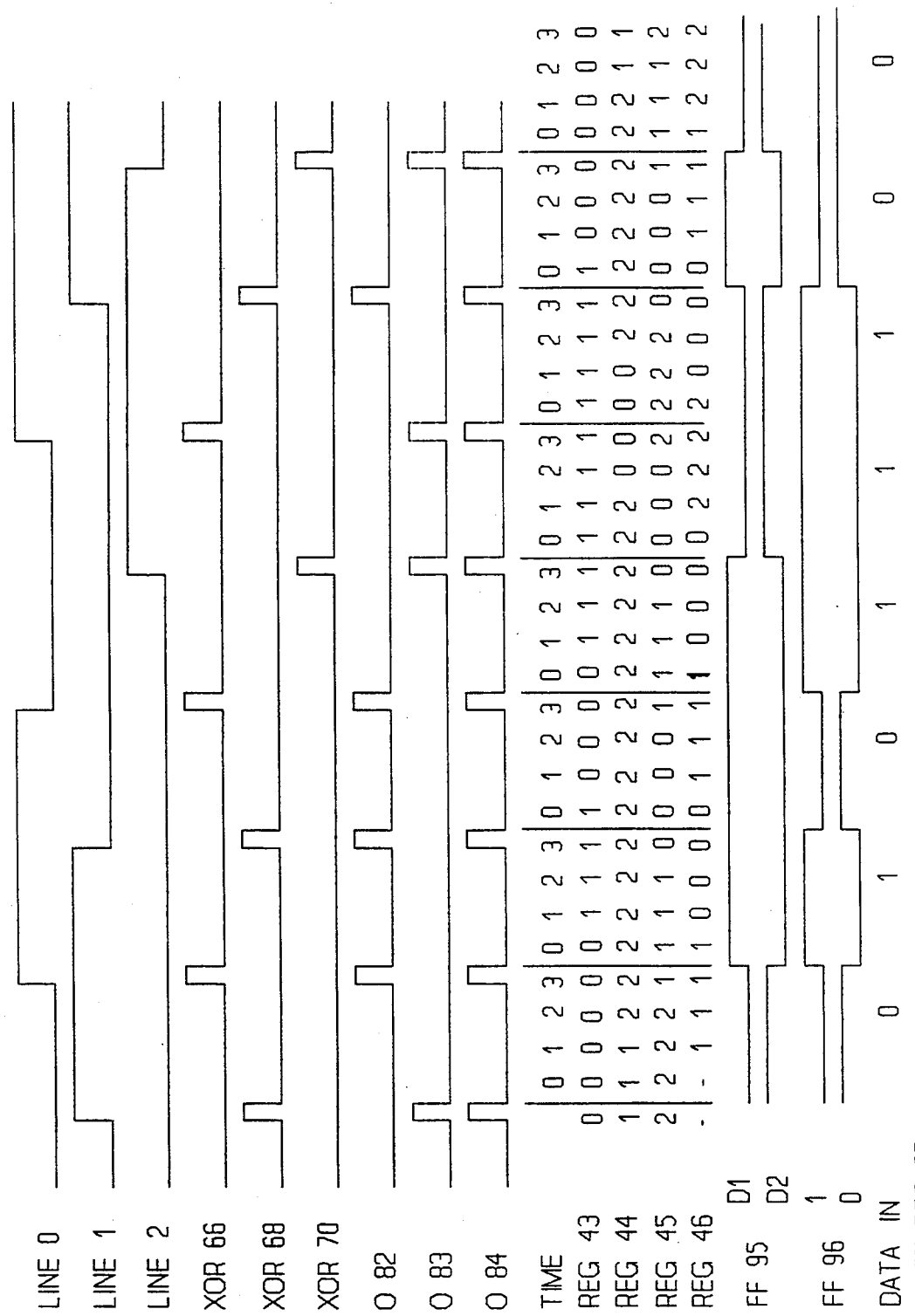
FIG. 4 is a timing chart illustrating the operation of the decoder of FIG. 2 operating as a three line serial data transmission system.

The operation of the decoder of FIG. 4 in the three line mode will be described with reference to the timing chart of FIG. 4. FIG. 4 illustrates the encoded data for eight binary data bits transmission periods being received on lines 0, 1 and 2 as encoded by the encoder of FIG. 1 and shown in FIG. 3, the addresses stored in registers 43, 44, 45 and 46 for each timing periods T0, T1, T2 and T3 for transmission period, the pulse output from the XORs 66, 68, and 70 of the transition detectors for lines 0, 1 and 2 respectively, the pulses appearing on the data line one D1 output of OR 82, the pulses appearing on the data line two D2 output of OR 83, the pulses appearing on the clock initiation line output of OR 84, the D and S output of multivibrator 95, the 1 and 0 outputs of multivibrator 96 and the value of the decoded data bit for each transmission period as stored in storage register 85. The encoder is assumed to be in the initialized state as heretofore described.

The first transmission period begins with the occurrence of a transition on line 1. At this time, the addresses stored in registers 43, 44 and 45 are 0, 1 and 2 respectively, AND 73 is conditioned by address decoder 61 selecting line 0 as the data line one D1 and AND 79 is conditioned by address decoder 62 selecting line 1 as the data line two D2. The transition on line 1 is sensed by the transition detector for line 1 causing a pulse output from XOR 68. The pulse from XOR 68 will pass through AND 79 and OR 83. The output pulse from OR 83 will reset bistable multivibrator 95, resulting in the S output being high and the D output being low, and will pass through OR 84 to clock 86 initiating the sequence of timing pulses T0, T1, T2 and T3. At this time, the 0 output is high and 1 output is low of multivibrator 95 thereby conditioning AND 98. At T0, shift register 85 is shifted. At T1, address 1 stored in register 44 will be transferred though AND 48, OR 49 and switch 56 and stored in register 46. At T2, address 2 stored in register 45 is transferred through AND 41 and stored in register 44 and the T2 timing pulse will pass through AND 98 storing a 0 into stage 7 of shift register 85. At T3, address 1 stored in register 46 is transferred to register 45 and address 2 stored in register 44 is transferred through AND 48 to address decoder 62 which then conditions AND 80.

The second transmission period begins with the occurrence of a transition on line 0. At this time, the addresses stored in registers 43, 44 and 45 are 0, 2 and 1 respectively, AND 73 is conditioned by address decoder 61 selecting line 0 as the data line one D1 and AND 80 is conditioned by address decoder 62 selecting line 2 as the data line two D2. The transition on line 0 is sensed by the transition detector for line 0 causing a pulse output from XOR 66. The pulse from XOR 66 will pass through AND 73 and OR 82. The output pulse from OR 82 will set bistable multivibrator 95, resulting in the D output being high and the S output being low, complement bistable multivibrator 96, resulting in the 1 output being high and the 0 output being low thereby conditioning AND 97, and will pass through OR 84 to clock 86 initiating the sequence of timing pulses T0, T1, T2 and T3. At T0, shift register 85 is shifted. At T1, address 0 stored in register 43 will be transferred though AND 47, OR 49 and switch 56 and stored in register 46. At T2, address 1 stored in register 45 is transferred through AND 40 and stored in register 43 and the T2 timing pulse will pass through AND 97 storing a 1 in stage 7 of shift register 85. At T3, address 0 stored in register 46 is transferred to register 45 and address 1 stored in register 43 is transferred through AND 47 to address decoder 61 which then conditions AND 74.

The third transmission period begins with the occurrence of a transition on line 1. At this time, the addresses stored in registers 43, 44 and 45 are 1, 2 and 0 respectively, AND 74 is conditioned by address decoder 61 selecting line 1 as the data line one D1 and AND 80 is conditioned by address decoder 62 selecting line 2 as the data line two D2. The transition on line 1 is sensed by the transition detector for line 1 causing a pulse output from XOR 68. The pulse from XOR 68 will pass through AND 74 and OR 82. The output pulse from OR 82 will set bistable multivibrator 95, resulting in the D output being high and the S output being low, complement bistable multivibrator 96, resulting in the 0 output being high and the 1 output being low thereby conditioning AND 98, and will pass through OR 84 to clock 86 initiating the sequence of timing pulses T0, T1, T2 and T3. At T0, shift register 85 is shifted. At T1, address 1 stored in register 43 will be transferred though AND 47, OR 49 and switch 56 and stored in register 46. At T2, address 0 stored in register 45 is transferred through AND 40 and stored in register 43 and the T2 timing pulse will pass through AND 98 storing a 0 in stage 7 of shift register 85. At T3, address 1 stored in register 46 is transferred to register 45 and address 0 stored in register 43 is transferred through AND 47 to address decoder 61 which then conditions AND 73.

The fourth transmission period begins with the occurrence of a transition on line 0. At this time, the addresses stored in registers 43, 44 and 45 are 0, 2 and 1 respectively, AND 73 is conditioned by address decoder 61 selecting line 0 as the data line one D1 and AND 80 is conditioned by address decoder 62 selecting line 2 as the data line two D2. The transition on line 0 is sensed by the transition detector for line 0 causing a pulse output from XOR 66. The pulse from XOR 66 will pass through AND 73 and OR 82. The output pulse from OR 82 will set bistable multivibrator 95, resulting in the D output being high and the S output being low, complement bistable multivibrator 96, resulting in the 1 output being high and the 0 output being low thereby conditioning AND 97, and will pass through OR 84 to clock 86 initiating the sequence of timing pulses T0, T1, T2 and T3. At T0, shift register 85 is shifted. At T1, address 0 stored in register 43 will be transferred though AND 47, OR 49 and switch 56 and stored in register 46. At T2, address 1 stored in register 45 is transferred through AND 40 and stored in register 43 and the T2 timing pulse will pass through AND 97 storing a 1 in stage 7 of shift register 85. At T3, address 0 stored in register 46 is transferred to register 45 and address 1 stored in register 43 is transferred through AND 47 to address decoder 61 which then conditions AND 74.

The fifth transmission period begins with the occurrence of a transition on line 2. At this time, the addresses stored in registers 43, 44 and 45 are 1, 2 and 0 respectively, AND 74 is conditioned by address decoder 61 selecting line 1 as the data line one D1 and AND 80 is conditioned by address decoder 62 selecting line 2 as the data line two D2. The transition on line 2 is sensed by the transition detector for line 2 causing a pulse output from XOR 70. The pulse from XOR 70 will pass through AND 80 and OR 83. The output pulse from OR 83 will reset bistable multivibrator 95, resulting in the S output being high and the D output being low, and will pass through OR 84 to clock 86 initiating the sequence of timing pulses T0, T1, T2 and T3. At this time, the 1 output is high and 0 output is low of multivibrator 96 thereby conditioning AND 97. At T0, shift register 85 is shifted. At T1, address 2 stored in register 44 will be transferred though AND 48, OR 49 and switch 56 and stored in register 46. At T2, address 0 stored in register 45 is transferred through AND 41 and stored in register 44 and the T2 timing pulse will pass through AND 97 storing a 1 into stage 7 of shift register 85. At T3, address 2 stored in register 46 is transferred to register 45 and address 0 stored in register 44 is transferred through AND 48 to address decoder 62 which then conditions AND 78.

The sixth transmission period begins with the occurrence of a transition on line 0. At this time, the addresses stored in registers 43, 44 and 45 are 1, 0 and 2 respectively, AND 74 is conditioned by address decoder 61 selecting line 1 as the data line one D1 and AND 78 is conditioned by address decoder 62 selecting line 0 as the data line two D2. The transition on line 0 is sensed by the transition detector for line 0 causing a pulse output from XOR 66. The pulse from XOR 66 will pass through AND 78 and OR 83. The output pulse from OR 83 will reset bistable multivibrator 95, resulting in the S output being high and the D output being low, and will pass through OR 84 to clock 86 initiating the sequence of timing pulses T0, T1, T2 and T3. At this time, the 1 output is high and 0 output is low of multivibrator 96 thereby conditioning AND 97. At T0, shift register 85 is shifted. At T1, address 0 stored in register 44 will be transferred though AND 48, OR 49 and switch 56 and stored in register 46. At T2, address 2 stored in register 45 is transferred through AND 41 and stored in register 44 and the T2 timing pulse will pass through AND 97 storing a 1 into stage 7 of shift register 85. At T3, address 0 stored in register 46 is transferred to register 45 and address 2 stored in register 44 is transferred through AND 48 to address decoder 62 which then conditions AND 80.

The seventh transmission period begins with the occurrence of a transition on line 1. At this time, the addresses stored in registers 43, 44 and 45 are 1, 2 and 0 respectively, AND 74 is conditioned by address decoder 61 selecting line 1 as the data line one D1 and AND 80 is conditioned by address decoder 62 selecting line 2 as the data line two D2. The transition on line 1 is sensed by the transition detector for line 1 causing a pulse output from XOR 68. The pulse from XOR 68 will pass through AND 74 and OR 82. The output pulse from OR 82 will set bistable multivibrator 95, resulting in the D output being high and the S output being low, complement bistable multivibrator 96, resulting in the 0 output being high and the 1 output being low thereby conditioning AND 98, and will pass through OR 84 to clock 86 initiating the sequence of timing pulses T0, T1, T2 and T3. At T0, shift register 85 is shifted. At T1, address 1 stored in register 43 will be transferred though AND 47, OR 49 and switch 56 and stored in register 46. At T2, address 0 stored in register 45 is transferred through AND 40 and stored in register 43 and the T2 timing pulse will pass through AND 98 storing a 0 in stage 7 of shift register 85. At T3, address 1 stored in register 46 is transferred to register 45 and address 0 stored in register 43 is transferred through AND 47 to address decoder 61 which then conditions AND 73.

The eighth transmission period begins with the occurrence of a transition on line 2. At this time, the addresses stored in registers 43, 44 and 45 are 0, 2 and 1 respectively, AND 73 is conditioned by address decoder 61 selecting line 0 as the data line one D1 and AND 80 is conditioned by address decoder 62 selecting line 2 as the data line two D2. The transition on line 2 is sensed by the transition detector for line 2 causing a pulse output from XOR 70. The pulse from XOR 70 will pass through AND 80 and OR 83. The output pulse from OR 83 will reset bistable multivibrator 95, resulting in the S output being high and the D output being low, and will pass through OR 84 to clock 86 initiating the sequence of timing pulses T0, T1, T2 and T3. At this time, the 0 output is high and 1 output is low of multivibrator 96 thereby conditioning AND 98. At T0, shift register 85 is shifted. At T1, address 2 stored in register 44 will be transferred though AND 48, OR 49 and switch 56 and stored in register 46. At T2, address 1 stored in register 45 is transferred through AND 41 and stored in register 44 and the T2 timing pulse will pass through AND 98 storing a 0 into stage 7 of shift register 85. At T3, address 2 stored in register 46 is transferred to register 45 and address 1 stored in register 44 is transferred through AND 48 to address decoder 62 which then conditions AND 79. Since this is the eighth transmission period, shift register 85 will contain the eight data bits, a byte, originally encoded by the encoder. At T3, the data byte can be read in parallel from shift register 85. The decoder is ready to receive the next data serial byte over the transmission line with address decoders 61 and 62 selecting the proper data line one D1 and data line two D2 to decode the next transition occurring on the transmission lines.

Figure 5:
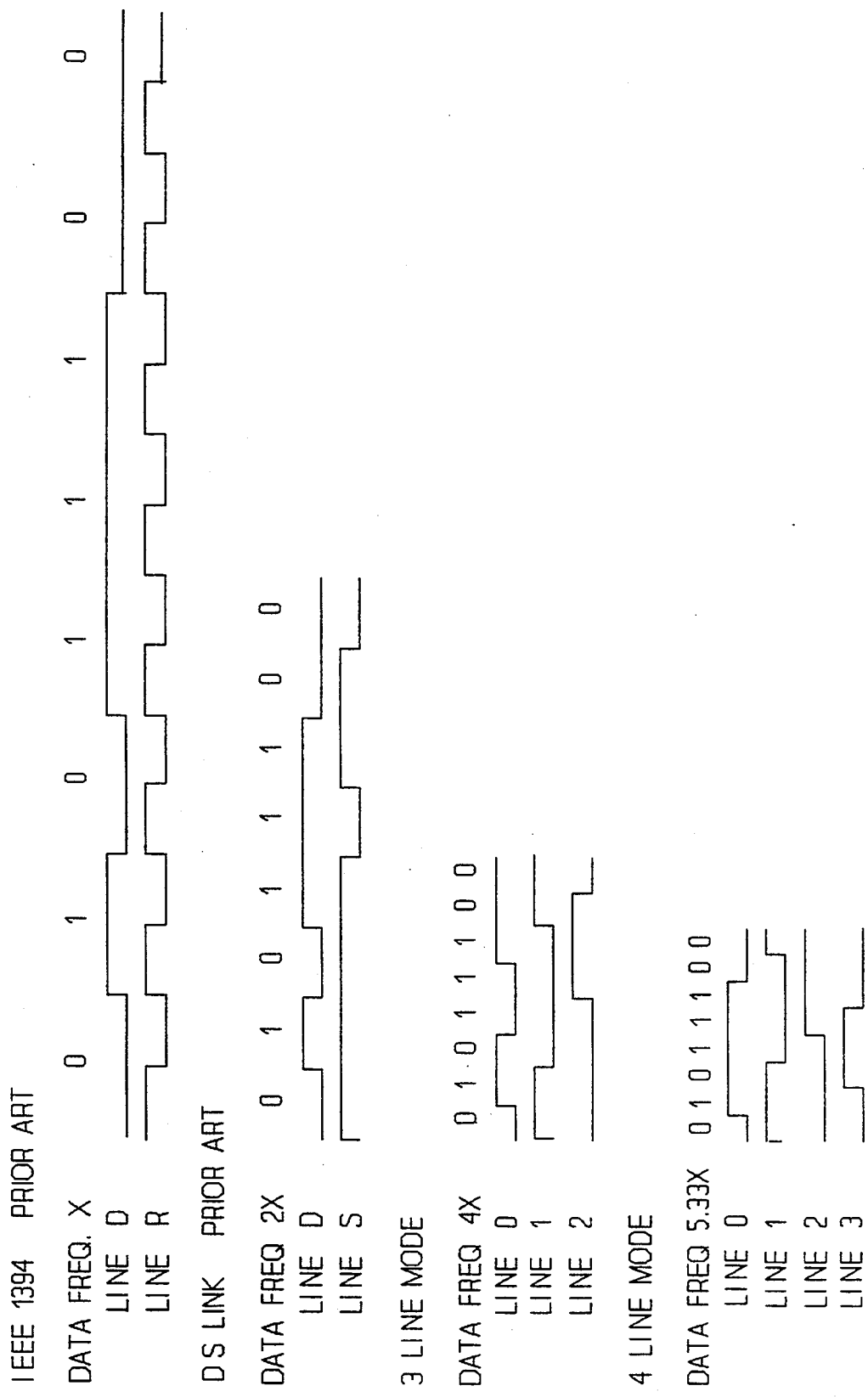
FIG. 5 is a diagram comparing the IEEE-1394 protocol, the DS link protocol and the encoder protocol for a three line and four line serial data transmission system.

FIG. 5 compares the IEEE-1394 protocol, the DS link protocol, and the three and four line of the serial data transmission system. It is assumed that the data frequency being shown is the maximum frequency for the bandwidth of the transmission lines being used. As can be seen the DS link will allow the frequency to be doubled without violating the allowable bandwidth for the transmission lines. The encoder in a three line mode demonstrates that the frequency can be quadrupled by the addition of one line without violating the bandwidth of the transmission lines being used. Finally, the encoder in the four line mode allows the base frequency to be increased by a factor of approximately 6 by the addition of the two lines, without violating the bandwidth of the transmission lines being used.

Table A shows the addresses for registers 13, 14, 15 and 37 when the encoder is in a four line mode for each of the same eight data periods shown in FIG. 3. This table exemplifies how the addresses are moved among these registers for the purpose of selecting data line one D1 and data line two D2 for each data period such that the bandwidth requirements of the transmission lines are not violated. The asterisk next to the addresses showing for registers 13 and 14 indicating the transmission line which will experience a transition in each data period.

TABLE A

| Data Period | 1 | 2 | 3 | 4 | 5 | 6 | 7 | 8 |
|---|---|---|---|---|---|---|---|---|
| Data value | 0 | 1 | 0 | 1 | 1 | 1 | 0 | 0 |
| Address Reg. 13 | 0 | 0* | 3* | 1* | 0 | 0 | 0* | 2 |
| Address Reg. 14 | 1* | 2 | 2 | 2 | 2* | 3* | 1 | 1* |
| Address Reg. 15 | 2 | 3 | 1 | 0 | 3 | 1 | 2 | 3 |
| Address Reg. 37 | 3 | 1 | 0 | 3 | 1 | 2 | 0 | 1 |

Table B illustrates the values of the addresses of each register if the encoder was expanded to a nine line mode. The additional registers are denoted by letters. The asterisk next to the addresses showing for registers 13 and 14 indicating the transmission line which will experience a transition in each data period.

TABLE B

| Data Period | 1 | 2 | 3 | 4 | 5 | 6 | 7 | 8 |
|---|---|---|---|---|---|---|---|---|
| Data value | 0 | 1 | 0 | 1 | 1 | 1 | 0 | 0 |
| Address Reg. 13 | 0 | 0* | 3* | 4* | 5 | 5 | 5* | 8 |
| Address Reg. 14 | 1* | 2 | 2 | 2 | 2* | 6 | 7 | 7* |
| Address Reg. 15 | 2 | 3 | 4 | 5 | 6 | 7 | 8 | 1 |
| Address Reg. 37 | 3 | 4 | 5 | 6 | 7 | 8 | 1 | 0 |
| Address Reg. V | 4 | 5 | 6 | 7 | 8 | 1 | 0 | 3 |
| Address Reg. W | 5 | 6 | 7 | 8 | 1 | 0 | 3 | 4 |
| Address Reg. X | 6 | 7 | 8 | 1 | 0 | 3 | 4 | 2 |
| Address Reg. Y | 7 | 8 | 1 | 0 | 3 | 4 | 2 | 6 |
| Address Reg. Z | 8 | 1 | 0 | 3 | 4 | 2 | 6 | 5 |

It can be shown that if the data transmission system is designed for five lines, the increase in the frequency will be by a factor of approximately 8 and if the system is designed for nine lines, an increase in frequency will be by a factor of approximately 16.

The data encoding protocol can be changed to any encoding protocol that would cause a transition to occur on one of two transmission lines for each data bit being encoded. One such alternative encoding protocol to the one used in the encoder of FIG. 1 and the decoder of FIG. 2 is to cause a transition for each data bit period on the data line if the value of the data bit being transmitted is a 1 or a transition on the strobe line if the value of the data bit being transmitted is a 0. The encoder would be modified such that shift register 20 had only eight stages where stage 0 would have a data output line D and a strobe output line S. The data line one D1 would be high and the data line two D2 would be low of stage 0 of shift register 20 when stage 0 contained a 1. The data line one D1 would be low and the data line two D2 would be high of stage 0 of shift register 20 when stage 0 contained a 0. No other changes need be made to the encoder. The decoder would be modified such that the output of OR 82 would be connected to the input of multivibrator 96 such that a transition pulse passing through OR 82 would set multivibrator 96 causing the 1 output to be high and the 0 output to be low and the output of OR 83 would be connected to the input of multivibrator 96 such that a transition pulse passing through OR 83 would reset multivibrator 96 causing the 0 output to be high and the 1 output to be low. No other changes need be made to the encoder. The data transmission system operation will remain the same as heretofore described and the system performance characteristics will remain the same; and While the invention has been particularly shown and described with reference to the preferred embodiments therefore, it will be understood by those skilled in the art that changes in form and detail may be made therein without departing from the spirit and scope of the invention. Given the above disclosure of general concepts and specific embodiments, the scope of the protection sought is defined by the following.

What is claimed is:

1. A data transmission system for serially transmitting binary data where each data bit is transmitted during a data period, said data transmission system comprising:

three or more transmission lines where each said transmission line has an unique address and where a data bit is encoded by a transition on only one of said transmission lines during each said data period;

encoding means connected to all said transmission lines for selecting for each said data period one of said transmission lines as a data line one and another one of said transmission lines as a data line two and for data encoding the binary data bit in each data period by generating said transition on either said data line one or said data line two whereby the transitions associated with any two consecutive data bits will not occur on any one of said transmission lines such that any two successive transitions that do occur on any one of said transmission lines will not occur at a frequency higher than the bandwidth of said transmission lines.

2. The data transmission system of claim 1 further comprising:

decoding means connected to all of said transmission lines for predicting and selecting for each said data period which one of said transmission lines was selected by the encoding means as a data line one and which one of said transmission lines was selected by the encoding means as a data line two and for decoding from said transition occurring on either said data line one or said data line two in each said data period the value of the binary data bit for said data period.

3. The data transmission system of claim 1 wherein said encoding means includes:

selection means for selecting the one of said transmission lines, other than the transmission line presently selected as the data line two, on which a transition has not occurred for the longest period of time as data line one for the next said data period when a transition was made on the data line one for the present data period or will select the one of said transmission lines, other than the transmission line presently selected as the data line one, on which a transition has not occurred for the longest period of time as data line two for the next said data period when a transition was 4. The data transmission system of claim 2 wherein said encoding means includes:

selection means for selecting the one of said transmission lines, other than the transmission line presently selected as the data line two, on which a transition has not occurred for the longest period of time as data line one for the next said data period when a transition was made on the data line one for the present data period or will select the one of said transmission lines, other than the transmission line presently selected as the data line one, on which a transition has not occurred for the longest period of time as data line two for the next said data period when a transition was made on the data line two for the present data period.

5. The data transmission system of claim 3 wherein said selection means comprises:

first storage means for storing the address of the transmission line selected as data line one;

second storage means for storing the address of the transmission line selected as data line two;

third storage means for storing in transition time order the address of all transmission lines, except for the addresses stored in said first and second storage means; and control means for exchanging the address in said first storage means with the oldest address in said third storage means when a transition was made on said data line one during the present data period or for exchanging the address in said second storage means with the oldest address in said third storage means when a transition was made on said data line two during the present data period.

6. The data transmission system of claim 4 wherein said selection means comprises:

first storage means for storing the address of the transmission line selected as data line one;

second storage means for storing the address of the transmission line selected as data line two;

third storage means for storing in transition time order the address of all transmission lines, except for the addresses stored in said first and second storage means; and control means for exchanging the address in said first storage means with the oldest address in said third storage means when a transition was made on said data line one during the present data period or for exchanging the address in said second storage means with the oldest address in said third storage means when a transition was made on said data line two during the present data period.

7. The data transmission system of claim 5 wherein said encoding means further comprises:

data encoding means for generating a transition on either the transmission line whose address is stored in said first storage means or the transmission line whose address is stored in said second storage means as a function of the value of the data bit to be transmitted during a data period.

8. The data transmission system of claim 7 wherein said data encoding means comprises:

selection means for providing, as a function of the value of the data bit to be transmitted during the present data period, signals indicating whether a transition should occur on the data line one or the data line two during said present data period;

transition means for each transmission line for causing signal transitions on said transmission lines;

control means in response to the address stored in said first and second storage means and said signals provided by said selection means for activating one of said transition means whereby a transition will occur on a selected one of said transmission lines for each data period.

9. The data transmission system of claim 6 wherein said decoding means further comprises:

a plurality of transition detectors where each transition detector is connected to one of said transmission lines for generating a transition pulse whenever a transition occur on said transmission line;

detection means connected to said selection means for generating signals indicating whether a transition pulse occurred on said data line one or on said data line two;

data decoding means connected to said detection means for retrieving the value of the binary data bit for the present data period.

10. A method for serially transmitting binary data, where each data bit is transmitted during a data period, in data transmission system comprised of three or more transmission lines where each said transmission line has an unique address, said method comprising the steps of:

selecting for each said data period a different pair of said transmission lines as a data line one and as a data line two than was selected for the preceding data period;

encoding the binary data bit for each data period by generating a transition on only either said data line one or said data line two whereby the transitions associated with any two consecutive data bits will not occur on any one of said transmission lines and any two consecutive transitions that do occur on any one of said transmission lines will not occur at a frequency higher than the bandwidth of said transmission lines; and decoding from said transition occurring on either said data line one or said data line two for each said data period the value of the binary data bit for said data period.

11. The method of claim 10 wherein said step of selecting includes the steps of:

selecting the one of said transmission lines, other than the transmission line presently selected as data line two, on which a transition has not occurred for the longest period of time as data line one for the next said data period when a transition was made on data line one for the present data period; or selecting the one of said transmission lines, other than the transmission line presently selected as data line one, on which a transition has not occurred for the longest period of time as data line two for the next said data period when a transition was made on data line two for the present data period.

12. A data transmission system for serially transmitting binary data where each data bit is transmitted during a data period, said data transmission system comprising:

three or more transmission lines where each said transmission line has an unique address;

encoding means connected to all said transmission lines for selecting for each said data period one of said transmission lines as a data line one and another one of said transmission lines as a data line two and for data encoding the binary data bit in each data period by generating a transition on either said data line one or said data line two whereby the transitions associated with any two consecutive data bits will not occur on any one of said transmission lines at a frequency higher than the bandwidth of said transmission lines, wherein said encoding means includes;

selection means for selecting the one of said transmission lines, other than the transmission line presently selected as the data line two, on which a transition has not occurred for the longest period of time as data line one for the next said data period when a transition was made on the data line one for the present data period or will select the one of said transmission lines, other than the transmission line presently selected as the data line one, on which a transition has not occurred for the longest period of time as data line two for the next said data period when a transition was made on the data line two for the present data period.

13. A data transmission system for serially transmitting binary data where each data bit is transmitted during a data period, said data transmission system comprising:

three or more transmission lines where each said transmission line has an unique address;

encoding means connected to all said transmission lines for selecting for each said data period one of said transmission lines as a data line one and another one of said transmission lines as a data line two and for data ii encoding the binary data bit in each data period by generating a transition on either said data line one or said data line two whereby the transitions associated with any two consecutive data bits will not occur on any one of said transmission lines at a frequency higher than the bandwidth of said transmission lines, wherein said encoding means includes;

selection means for selecting the one of said transmission lines, other than the transmission line presently selected as the data line two, on which a transition has not occurred for the longest period of time as data line one for the next said data period when a transition was made on the data line one for the present data period or will select the one of said transmission lines, other than the transmission line presently selected as the data line one, on which a transition has not occurred for the longest period of time as data line two for the next said data period when a transition was made on the data line two for the present data period; and decoding means connected to all of said transmission lines for selecting for each said data period one of said transmission lines as a data line one and another one of said transmission lines as a data line two and for decoding from said transition occurring on either said data line one or said data line two in each said data period the value of the binary data bit for said data period.

14. The data transmission system of claim 12 wherein said selection means comprises:

first storage means for storing the address of the transmission line selected as data line one;

second storage means for storing the address of the transmission line selected as data line two;

third storage means for storing in transition time order the address of all transmission lines, except for the addresses stored in said first and second storage means; and control means for exchanging the address in said first storage means with the oldest address in said third storage means when a transition was made on said data line one during the present data period or for exchanging the address in said second storage means with the oldest address in said third storage means when a transition was made on said data line two during the present data period.

15. The data transmission system of claim 13 wherein said selection means comprises:

first storage means for storing the address of the transmission line selected as data line one;

second storage means for storing the address of the transmission line selected as data line two;

third storage means for storing in transition time order the address of all transmission lines, except for the addresses stored in said first and second storage means; and control means for exchanging the address in said first storage means with the oldest address in said third storage means when a transition was made on said data line one during the present data period or for exchanging the address in said second storage means with the oldest address in said third storage means when a transition was made on said data line two during the present data period.

16. The data transmission system of claim 14 wherein said encoding means further comprises:

data encoding means for generating a transition on either the transmission line whose address is stored in said first storage means or the transmission line whose address is stored in said second storage means as a function of the value of the data bit to be transmitted during a data period.

17. The data transmission system of claim 16 wherein said data encoding means comprises:

selection means for providing, as a function of the value of the data bit to be transmitted during the present data period, signals indicating whether a transition should occur on the data line one or the data line two during said present data period;

transition means for each transmission line for causing signal transitions on said transmission lines;

control means in response to the address stored in said first and second storage means and said signals provided by said selection means for activating one of said transition means whereby a transition will occur on a selected one of said transmission lines for each data period.

18. The data transmission system of claim 15 wherein said decoding means further comprises:

a plurality of transition detectors where each transition detector is connected to one of said transmission lines for generating a transition pulse whenever a transition occurs on said transmission line;

detection means connected to said selection means for generating signals indicating whether a transition pulse occurred on said data line one or on said data line two;

data decoding means connected to said detection means for retrieving the value of the binary data bit for the present data period.

19. A method for serially transmitting binary data, where each data bit is transmitted during a data period, in a data transmission system comprised of three or more transmission lines where each said transmission line has an unique address, said method comprising the steps of:

selecting for each said data period a different pair of said transmission lines as a data line one and as a data line two than was selected for the preceding data period, wherein said step of selecting includes the steps of;

selecting the one of said transmission lines, other than the transmission line presently selected as data line two, on which a transition has not occurred for the longest period of time as data line one for the next said data period when a transition was made on data line one for the present data period; or selecting the one of said transmission lines, other than the transmission line presently selected as data line one, on which a transition has not occurred for the longest period of time as data line two for the next said data period when a transition was made on data line two for the present data period; and encoding the binary data bit for each data period by generating a transition on either said data line one or said data line two whereby the transitions associated with any two consecutive data bits will not occur on any one of said transmission lines at a frequency higher than the bandwidth of said transmission lines; and decoding from said transition occurring on either said data line one or said data line two for each said data period the value of the binary data bit for said data period.

* * * * *

UNITED STATES PATENT AND TRADEMARK OFFICE
CERTIFICATE OF CORRECTION

PATENT NO. : 5,408,501　　　　　　　　　　Page 1 of 2
DATED　　　: April 18, 1995
INVENTOR(S) : Stephen R. Cornaby It is certified that error appears in the above-indentified patent and that said Letters Patent is hereby corrected as shown below:

```
Column 1, line 13, "tem" should be --tems--;
Column 3, line 31, after "for" insert --the--;
Column 4, line 12, after "22," insert a blank space;
Column 4, line 25, after "system" delete the comma "," and
                   insert a period -- . --;
Column 5, line 14, "transfer" should be --transferred--;
Column 5, line 39, "describe" should be --described--;
Column 8, line 11, "a" should be --an--;
Column 8, line 44, after "low," insert a blank space;
Column 8, line 50, "though" should be --through--;
Column 9, line 8, "though" should be --through--;
Column 9, line 34, "though" should be --through--;
Column 9, line 60, "though" should be --through--;
Column 10, line 10, "OR" should be --OR--;
Column 10, line 38, after "low," insert a blank space;
Column 11, line 2, "though" should be --through--;
Column 12, line 64, after "same" delete "; and";
Column 13, line 51, after "was" insert --made on the data line
                    two for the present data period.--;
```

UNITED STATES PATENT AND TRADEMARK OFFICE
CERTIFICATE OF CORRECTION

PATENT NO. : 5,408,501
DATED : April 18, 1995
INVENTOR(S) : Stephen R. Cornaby

It is certified that error appears in the above-indentified patent and that said Letters Patent is hereby corrected as shown below:

```
Column 14, line 64, "occur" should be --occurs--;
Column 15, line 6, after "in" insert --a--;
Column 16, line 14, after "data" delete "ii".
```

Signed and Sealed this

Twenty-eighth Day of May, 1996

Attest:

BRUCE LEHMAN

*Attesting Officer*   *Commissioner of Patents and Trademarks*